Dec. 14, 1948.  F. S. YOUNG  2,456,234
BOLT PROTECTOR
Filed June 20, 1945
Fig. 1.
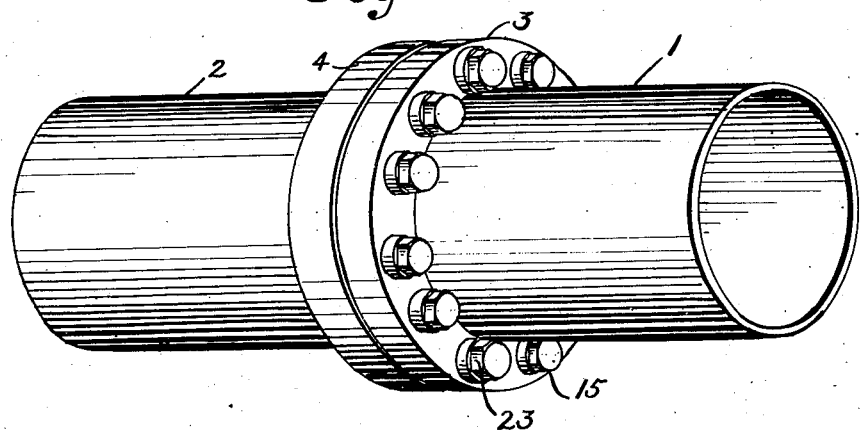
Fig. 2.
Fig. 3.
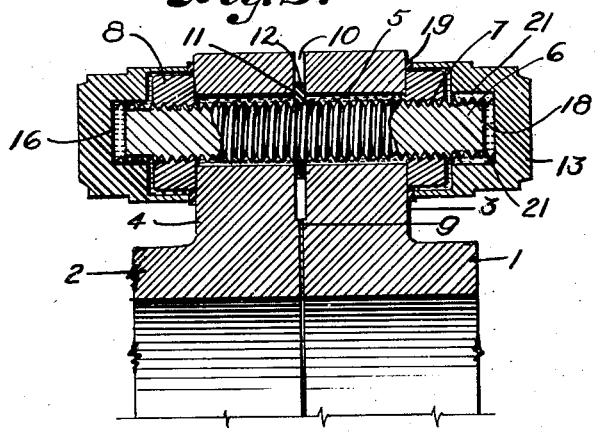
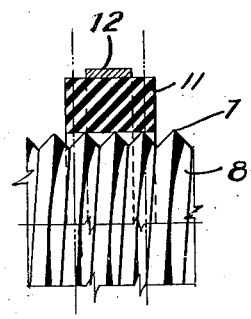
Fig. 4.  Fig. 5.
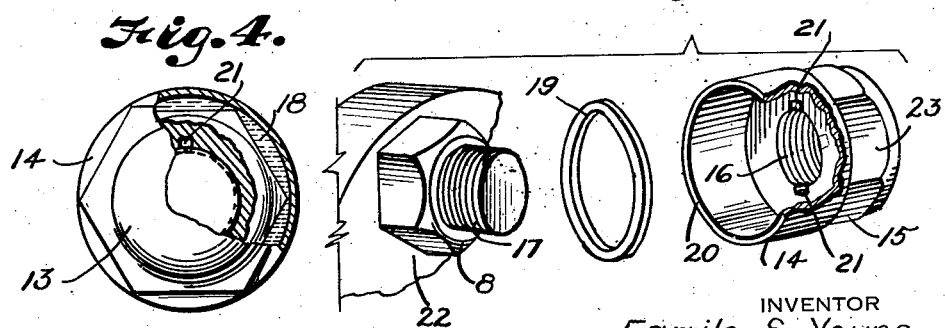
INVENTOR
Farrile S. Young
BY
Fishburn & Mullendore
ATTORNEYS.

Patented Dec. 14, 1948

2,456,234

UNITED STATES PATENT OFFICE 2,456,234

BOLT PROTECTOR

Farrile S. Young, Kansas City, Mo., assignor to Panhandle Eastern Pipe Line Company, Kansas City, Mo., a corporation of Delaware Application June 20, 1945, Serial No. 600,529

1 Claim. (Cl. 285—130)

This invention relates to bolt protectors and is particularly adaptable for use in connection with bolted pipe joints for metal piping for use underground or other places where the piping is subject to electrolytic corrosion.

In use of bolts in pipe joints of this character, there is a great tendency for the bolts and nuts to lose a greater quantity of metal as compared with the remainder of the joint, and the joint will fail by corrosion of the bolts and nuts while the remainder of the joint is still in relatively good condition.

The principal objects of the present invention are to provide a protector for the bolts which will prevent moisture and other corrosive materials from coming in contact with the bolts and nuts; to provide a seal between the flanges of the pipe joint so that the corrosive material will not come in contact with the shank of the bolt; to provide a cap for the outer end of the bolt having a screw threaded socket which may be threaded onto the bolt; to provide a sealing material in said cap; to provide grooves in the threads of the shank portion of said cap whereby said sealing material may be forced therethrough around the bolt and nut to completely seal said bolt; and to provide a bolt protector simple, economical and efficient in use.

In accomplishing these and other objects of the present invention, I have provided an improved structure, the preferred form of which is illustrated in the accompanying drawings wherein:

Fig. 1 is a perspective view of my invention showing a flanged pipe joint with bolt protectors embodying the features of my invention.

Fig. 2 is a longitudinal cross-sectional view of the invention.

Fig. 3 is an enlarged longitudinal cross-section of a part of the bolt showing the sealing material and retaining ring between the flanges.

Fig. 4 is an end view of a bolt illustrating the cap for protecting the nut portion with parts broken away to better illustrate the invention.

Fig. 5 is a perspective exploded view of one end of the bolt, nut, sealing ring and cap portion of my invention.

Referring more in detail to the drawings:

1 and 2 designate joints of pipes having flanges 3 and 4 having a plurality of bore opening 5 adapted to receive bolts 6 having threads 7 throughout their entire length and adapted to receive nuts 8 on their respective ends, as best illustrated in Fig. 2.

While I have illustrated my invention as applied to pipe joints having flanged ends usually adapted for underground use, it will be obvious that it may be applied to other forms of pipe joint. In the form of invention illustrated, the inner faces of the flanges 3 and 4 are provided with offset portions 9 providing a space 10 between the flanges, as best illustrated in Fig. 2.

To provide a seal around the bolt shank between the flanges, I preferably provide a compressible material 11, such as rubber or any other suitable material, adapted to be held in place by a retaining ring 12 which may be made of brass or other suitable material so that when the flanges are forced together by tightening of the nuts on the respective ends of the bolts, the action will compress the gasket material to seat snugly between the flanges. The ring 12 will prevent the gasket from being forced outwardly, but will cause the gasket material to be uniformly seated around the bore openings in the flanges to seal off any corrosive material from entering such openings around the bolts.

In order to protect the outer end of the bolts and the nuts attached thereto, I provide caps 13 preferably made of metal or other suitable material having a cylindrical portion 14 of a size adapted to fit over the nuts 8. The outer end of the caps is provided with a solid shank portion 15 having internally threaded bore openings 16 adapted to engage the threaded portion 17 of the bolts extending outwardly from the nuts 8 after said nuts are tightened on said bolts to join the pipe joints together.

In order to protect the end of the bolt and nut, I preferably fill the cylindrical portion 14 of the cap with a plastic material 18, such as grease or the like, before applying the cap to the outer end of the bolt. I also provide a sealing ring 19 adapted to engage the outer side of the flanges 3 and 4 and the inner edge 20 of the cylindrical portion 14 of the cap. The internal threaded shank portions of the caps are provided with longitudinal slots or grooves 21 of a depth slightly greater than the threads in said shanks so that the plastic material contained in the caps will be forced therethrough upon tightening of the caps on the bolts, as later described. While I have here illustrated two slots in the bolts, it will be obvious that a lesser or greater number may be used as desired.

Operation of a device constructed as illustrated and described is as follows.

The pipe joints with their flanges are placed in end-to-end relation and the bolts are inserted in the bore openings in said flanges. I preferably apply a liberal coating of the plastic material to the shanks of the bolts so that the bore openings will be completely filled and the shanks protected by the material. Tightening of the nuts 8 on the bolts 6 will cause the compressible material 11 to be forced in the bore openings 5 around the threaded shank of the bolts in the space 10 between the flanges 3 and 4 and the ring 12 will retain the compressible material between the flanges and prevent escape therefrom. I have here illustrated the nuts 8 to be of hex-shape, although it will be obvious that any form may be used.

After the nuts are securely tightened in place, the plastic material 18 may be placed in the cylindrical portion 14 of the cap 13 in an amount to substantially fill such cylindrical portion and allow a portion thereof to be forced into the bore opening 16 of the cap. The sealing ring 19 is then placed around the nut 8 to seat against the outside face 22 of the flanges 3 and 4. The cap is then screwed onto the bolt 6 by engagement of the threaded bore opening 16 on the threaded portion 17 of the portion of the bolt extending outwardly from the nut 8, and tightening of the cap on the bolt will cause the plastic material to be forced by the screw action of the cap and bolt through the slots 21 in the shank of the cap to cover and engage all parts of the outer ends of the bolt and nut so that the entire portion of the bolts and nuts will be sealed by such plastic material and the compressible material between the flanges, and thus prevent corrosive material from contacting such parts. It will be noted I have also shown the caps as having a hex-shape near the outer portion thereof, as indicated at 23, in order to receive a tool for tightening the same on the bolts.

If desired, an inhibitor may be added to the plastic material in said caps to further prohibit corrosion of the metal. Any known inhibitor may be used which will prevent corrosion of metal.

It will be obvious from the foregoing that I have provided an improved bolt protector whereby the bolts and nuts therefor will be completely sealed against corrosive material and a device which is inexpensive and simple in operation.

What I claim and desire to secure by Letters Patent is:

A device of the character described comprising, pipe sections having spaced flanges provided with openings, threaded bolts adapted to engage in said openings, said bolts being smaller than said openings, a compressible sealing material adapted to encircle said bolts between said flanges to form a seal of the openings around said bolts and said flanges, a ring surrounding said compressible material for retaining said compressible sealing material in place, nuts to hold the flanges together and compress the sealing material between the flanges, caps having a lubricant therein for enclosing the nuts on the ends of the bolts, rings having sealing engagement with the outer surfaces of the flanges and said caps and forming closed chambers around the ends of the threaded bolts outwardly of said compressible sealing material between said flanges, and grooves in the threaded bolts to permit movement of lubricant from the caps through the nuts and around said threaded bolts in the respective chambers, said compressible sealing material entering the grooves in said bolts between the flanges upon tightening of said nuts.

FARRILE S. YOUNG.

REFERENCES CITED

The following references are of record in the file of this patent:

UNITED STATES PATENTS

| Number | Name | Date |
|---|---|---|
| 117,546 | Kibler | Aug. 1, 1871 |
| 1,254,514 | Lehmann | Jan. 22, 1918 |
| 1,504,452 | Hirst | Aug. 12, 1934 |
| 2,009,744 | Pfefferle | July 30, 1935 |
| 2,072,893 | Lee | Mar. 9, 1937 |